Patented Nov. 29, 1932

1,888,993

UNITED STATES PATENT OFFICE

SIMON J. LUBOWSKY, OF JERSEY CITY, NEW JERSEY, ASSIGNOR TO METAL & THERMIT CORPORATION, OF CARTERET, NEW JERSEY, A CORPORATION OF NEW JERSEY

PROCESS OF MAKING TITANIUM WHITE

No Drawing. Application filed July 10, 1928. Serial No. 291,696.

This invention relates to processes of making titanium white; and it comprises an improvement in the process of making titanium white disclosed in Patent No. 1,640,952 wherein titanium dioxid formed by hydrolysis of a solution of double sulfate of titanium and magnesium is held in contact and digested with the mother liquor at superatmospheric pressure for a time; digestion being usually at a temperature of 135–140° C. and the time of contact being usually of the order of 4 or 5 hours; all as more fully hereinafter set forth and as claimed.

"Titanium white" is the commercial name of various preparations containing, or composed of, $TiO_2$ and produced from rutile, ilmenite, etc., by various processes. In a prior Patent, No. 1,640,952, I have described and claimed an advantageous way of making a brilliant white form of titanium dioxid wherein rutile is heated with magnesia to a high temperature, producing a chemical combination between the magnesia and the titanium oxide. The resultant product is readily soluble in mineral acids and gives solutions containing titanium. These solutions when heated to a temperature around their boiling point hydrolyze with the production of a brilliant white precipitate. This precipitate is used as a pigment and is of pure white character. In practice, the synthetic heated mass is treated with sulfuric acid and the product of reaction is dissolved in a little water. The water solution formed has a boiling point a little above 100° C. When the solution is heated hydrolysis takes place with production of the described pigment. In practice this solution is usually heated in closed lead lined containers and the precipitate and mother liquor separated as soon as hydrolysis is complete.

I have now found that the pigment so obtained can be considerably improved in covering power and the other properties valuable in a pigment by maintaining the precipitate in contact with the hot mother liquor, that is, digesting it therewith for a substantial length of time. Improved results are obtained by effecting digestion at a temperature and pressure considerably above those usually employed in hydrolysis. The best results I have secured have been by maintaining contact between mother liquor and precipitate for a period of 4 or 5 hours at a temperature around 135–140°C. During this period, changes occur in the precipitate which result in the formation of a pigment of distinctly coarser appearance, but decidedly greater covering power. The opacity is quite markedly increased.

While the present process can be effected by transferring the hydrolyzed product of reaction of my prior patent to a pressure kettle, it is more convenient to perform the whole operation in the pressure apparatus. In so doing, the procedure of the prior patent may be followed as regards the initial hydrolytic production of the pigment. After its production, the temperature and pressure may be raised for the digestion of the present invention. In following the procedure of the prior patent rutile is mixed with magnesium oxid and calcined at about Seger cone 18 until chemical combination ensues and a hard, semi-vitreous material is obtained. The calcined material is then ground to about 150 mesh and heated to about 90° C. with 2.5 times its weight of sulfuric acid with agitation. A cake is obtained and this is dissolved in water, using about 2 parts by weight of water for each part of sulfuric acid. The mass dissolves to a clear greenish solution. This is placed in a pressure apparatus and hydrolyzed, the temperature being finally carried to 135–140° C. The precipitate which forms in the first stage of operation is kept in contact with the mother liquor at this temperature and pressure for a period of 4 or 5 hours. The precipitate produced is quite different in its physical nature from the precipitate produced without the pressure digestion. While I do not bind myself to any theory of the actual mechanism of the changes which the precipitate undergoes as to its physical nature during this period, the result certainly is a growth of the initial particles and to a magnitude of an appreciably higher order. The enlarged particle appears to be of sufficient thickness in all planes to obstruct the passage of impinging light rays, giving more reflection and less transmission. Placed in oil, this material exhibits a greater opacity than the initial material; the product of the prior process. It is possible that the crystalline form of the particle changes and in changing additional surfaces of refraction are obtained.

The preferred temperatures of 135–140° C. correspond to a steam pressure of 45–52.2 pounds gage; and it is convenient to follow the temperatures by observation of the gage pressure.

What I claim is:—

1. In the production of titanium white by a process comprising hydrolysis of a solution of titanium and magnesium salts obtained by dissolving with acid a product produced by heating together titanium oxid and magnesium oxid, the improvement which comprises heating the titanium-magnesium salt solution at a temperature above 100° C., thereby precipitating a titanium compound, and thereafter digesting the precipitate with its mother liquor for an extended time under superatmospheric pressure and at a temperature corresponding thereto, thereby increasing the opacity and improving the pigmentary covering power of the precipitated product.

2. In the production of titanium white by a process comprising hydrolysis of a solution of magnesium-titanium sulfate obtained by dissolving with sulfuric acid a product produced by heating together titanium oxid and magnesium oxid, the improvement which comprises heating the titanium-magnesium sulfate solution at a temperature above 100° C. thereby precipitating a titanium compound and thereafter digesting the precipitate with its mother liquor for an extended time under super-atmospheric pressure and at a temperature corresponding thereto, thereby increasing the opacity and improving the pigmentary covering power of the precipitated product.

3. In the production of titanium white by a process comprising hydrolysis of a solution of magnesium-titanium sulfate obtained by dissolving in sulfuric acid a product produced by heating together titanium oxid and magnesium oxid, the improvement which comprises heating the titanium-magnesium sulfate solution at a temperature above 100° C., thereby precipitating a titanium compound, and thereafter digesting the precipitate with its mother liquor for several hours under super-atmospheric pressure and at a temperature of the order of 135–140° C., thereby increasing the opacity and improving the pigmentary covering power of the precipitated product.

In testimony whereof I affix my signature.

SIMON J. LUBOWSKY.